US009409613B2

(12) United States Patent
Hakes (10) Patent No.: US 9,409,613 B2
(45) Date of Patent: Aug. 9, 2016

(54) TRACK SYSTEM FOR A MACHINE (71) Applicant: Caterpillar Inc., Peoria, IL (US)

(72) Inventor: David Hakes, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 155 days.

(21) Appl. No.: 14/154,768

(22) Filed: Jan. 14, 2014

(65) Prior Publication Data

US 2015/0197294 A1 Jul. 16, 2015

(51) Int. Cl.
*B62D 55/14* (2006.01)
*B62D 55/20* (2006.01)
*B62D 55/28* (2006.01)
*B62D 55/15* (2006.01)

(52) U.S. Cl.
CPC .............. *B62D 55/202* (2013.01); *B62D 55/14* (2013.01); *B62D 55/15* (2013.01); *B62D 55/28* (2013.01)

(58) Field of Classification Search
CPC ............................... B62D 55/14; B62D 55/145
USPC .......................................... 305/136, 137, 142
See application file for complete search history.

(56) References Cited

U.S. PATENT DOCUMENTS 3,007,745 A * 11/1961 Even ................... B62D 55/0966
305/194
3,985,402 A * 10/1976 Reinsma ............ B62D 55/1086
267/292
4,569,561 A 2/1986 Edwards et al.
4,695,102 A * 9/1987 Crotti ................... B62D 55/092
305/100
4,890,892 A * 1/1990 Haslett ................. B62D 55/145
295/11
5,704,697 A 1/1998 Ketting et al.
5,752,574 A * 5/1998 Oertley .................. B62D 55/14
180/9.1
5,908,226 A 6/1999 Courtemanche
7,237,853 B2 * 7/2007 Yamamoto ............. B62D 55/15
305/130
2005/0151421 A1* 7/2005 Colwell ................. B62D 55/14
305/185
2005/0253453 A1* 11/2005 Miller ................ B62D 55/0966
305/136
2011/0006597 A1 1/2011 Diekevers et al.
2014/0346856 A1* 11/2014 Colwell .................. B62D 55/26
305/185
2015/0197294 A1* 7/2015 Hakes .................. B62D 55/202
305/142

FOREIGN PATENT DOCUMENTS

JP 55011929 1/1980
JP 2001146182 5/2001
JP 2005225367 8/2005

* cited by examiner

Primary Examiner — Jeffrey J Restifo
(74) Attorney, Agent, or Firm — Leydig, Voit & Mayer, Ltd.

(57) ABSTRACT

A track pad is disclosed for use in a track system of a tracked machine. The track system includes a plurality of track guiding rollers having annular engagement surfaces. The track pad includes a pad body having a wear surface, and a rail surface opposite the wear surface adapted for complementary positioning with at least one track guiding roller. The rail surface includes a profile that is convex or concave. The profile is adapted to complement the at least one track guiding roller, which presents a profile that is the other of convex or concave.

20 Claims, 6 Drawing Sheets

TRACK SYSTEM FOR A MACHINE

TECHNICAL FIELD

This patent disclosure relates generally to track systems for track-type machines, and, more particularly to track systems utilized in mining and construction machinery.

BACKGROUND

Different types of mining and construction machines, such as excavators, wheel loaders, hydraulic mining shovels, cable shovels, bucket wheels, and draglines commonly employ track systems, as opposed to wheels. In large mining shovels, for example, the undercarriage tracks include a plurality of track pads connected to one another by pins, thereby creating pivoting joints between the adjacent track pads. The track pads are typically cast components, and so are formed as a single, integral cast piece. The track pad includes a ground-engaging portion having a relatively large surface area, which is designed to distribute the weight and forces of the mining shovel or other heavy equipment. The track pad may further include a pair of laterally spaced rail surfaces designed to engage a track roller. Conventional designs of track pads create high hertzian stress, which can cause spalling along the edges of the rail surface, particularly when the machine is inclined and the track pad is angled relative to the roller. The track roller path of machines used in heavy-duty applications are particularly susceptible to wear and spall under relatively modest angles of articulation due to hertzian stresses developed in mating surfaces.

Wear along the surfaces of the links and rollers of track systems may also result from highly abrasive materials encountered during operation. Continued operation of the moving undercarriage structure produces wear along the entire contacting surfaces of the links and rollers. Replacement of the track pads and/or rollers in the track systems of mining and construction machinery can be very costly and labor intensive. Moreover, work stoppages waiting for replacement parts and/or for replacement of the parts themselves may have a direct effect on machine efficiency, and, by extension, related operations.

Attempts have been made to extend the wear life of the undercarriage structure through modification of the roller and/or pad structures. U.S. Pat. No. 5,752,574 to Oertley, for example, discloses an arrangement wherein first and second track guiding rollers are connected to respective parallel roller frame assemblies with axes of rotation of each guide roller in a substantially non-perpendicular relationship to the longitudinally extending centerline, producing a "toe-out" or "toe-in" of the guide rollers. While some improvements have been made in extending the life of guide rollers and track pads, further improvements are desirable, particularly with regard to relatively large machines.

SUMMARY

The disclosure describes, in one aspect, a track pad for use in conjunction with a track system of a tracked machine. The track system includes a plurality of track guiding rollers having annular engagement surfaces. The track pad includes a pad body having a wear surface, and a rail surface opposite the wear surface. The rail surface is adapted for complementary positioning with at least one track guiding roller in the track system. The rail surface includes a profile that is convex or concave. The profile is adapted to complement the at least one track guiding roller, which presents a profile that is the other of convex or concave.

The disclosure describes, in another aspect, a track system for use in a tracked machine. The track system includes a plurality of track guiding rollers and a track chain assembly. Each track guiding roller has an annular engagement surface. The track chain assembly has a plurality of track pads. At least one track pad includes a pad body having a wear surface, and a rail surface opposite the wear surface. The rail surface is adapted for complementary positioning with at least one track guiding roller in the track system. At least one of the rail surface of the track pad and the annular engagement surface of the track guiding roller presents an engaging surface with a convex profile, while the other of the rail surface of the track pad and the annular engagement surface of the track guiding roller presents a complementary engaging surface with a concave profile.

The disclosure describes, in yet another aspect, a track system for use in a tracked machine. The track system includes a plurality of track guiding rollers and a track chain assembly. Each track guiding roller has an annular engagement surface. The track chain assembly has a plurality of track pads. At least one track pad includes a pad body having a wear surface, and a rail surface opposite the wear surface. The rail surface is adapted for complementary positioning with at least one track guiding roller in the track system. At least one of the rail surface of the track pad and the annular engagement surface of the track guiding roller presents an engaging surface with a convex profile, while the other of the rail surface of the track pad and the annular engagement surface of the track guiding roller presents a complementary engaging surface with a concave profile. The rail surface of the track pad engages at least 25% of the width of the engagement surface of the track guiding roller.

DETAILED DESCRIPTION

Figure 1:
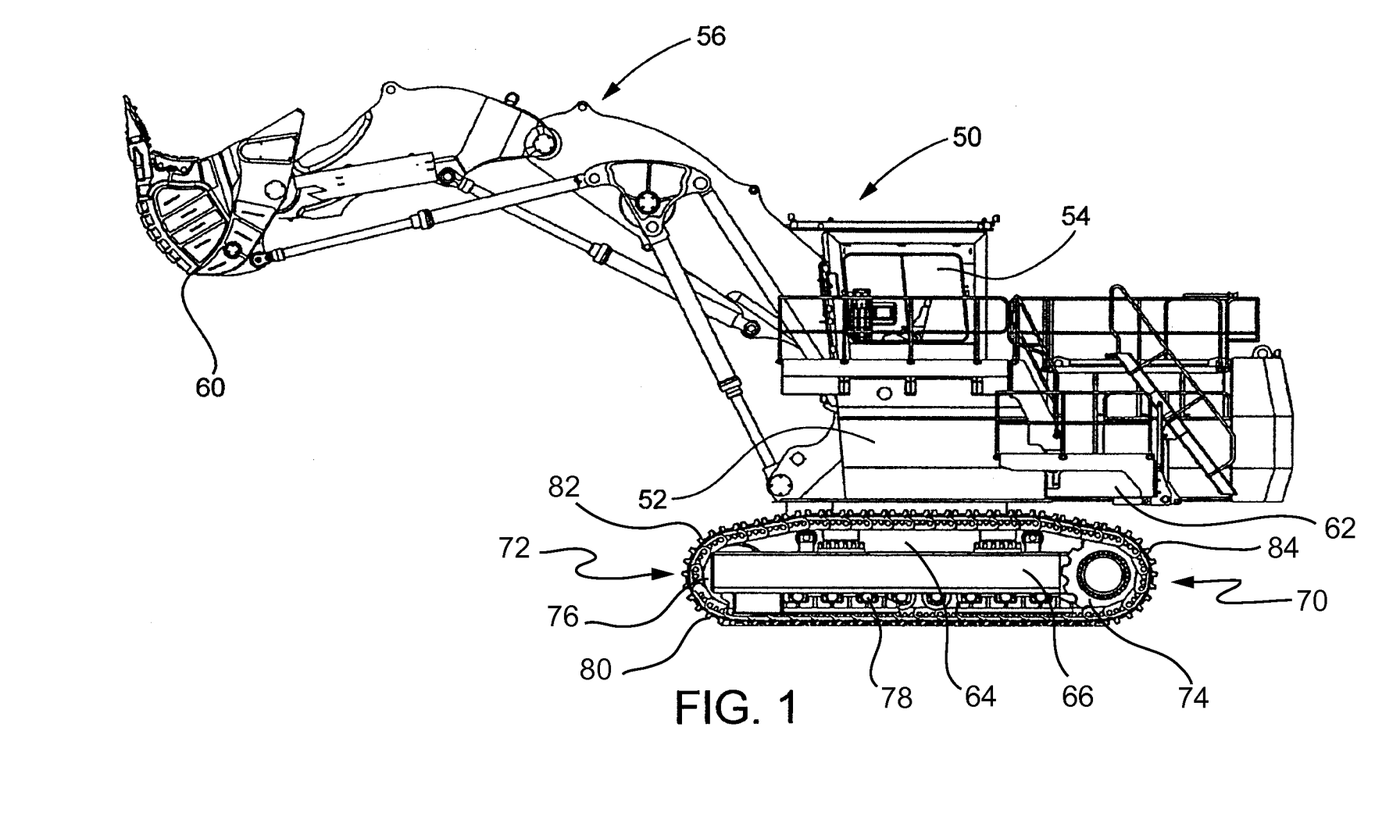
FIG. 1 is a diagrammatic side elevational view of an embodiment of a machine including an embodiment of a track system constructed in accordance with principles of the present disclosure.

This disclosure relates to track systems for large mobile machinery typically utilized in mining and/or construction. FIG. 1 shows an embodiment of a tracked machine 50 in the form of a hydraulic shovel that includes an embodiment of a track system 70 constructed in accordance with principles of the present disclosure. Among other uses, a hydraulic shovel can be used to load overburden and ore into haul trucks during the mining process in various surface mine applications.

While the arrangement is illustrated in connection with a hydraulic mining shovel, the arrangement disclosed herein has universal applicability in various other types of machines commonly employ track systems, as opposed to wheels. The term "machine" may refer to any machine that performs some type of operation associated with an industry such as mining or construction, or any other industry known in the art. For example, the machine may be an excavator, wheel loader, cable shovel, or dragline or the like. Moreover, one or more implements may be connected to the machine. Such implements may be utilized for a variety of tasks, including, for example, lifting and loading.

As shown in FIG. 1, the machine 50 may include a body 52 with a cab 54 to house a machine operator. The machine may also include a boom system 56 pivotally connected at one end to the body 52 and supporting an implement 60 at an opposing, distal end. In embodiments, the implement 60 can be any suitable implement, such as a bucket, a clamshell, a blade, or any other type of suitable device. A control system can be housed in the cab 54 that can be adapted to allow a machine operator to manipulate and articulate the implement 60 for digging, excavating, or any other suitable application.

The body 52 may be supported on a main frame 62 supported on an undercarriage structure 64. The undercarriage structure 64 includes a supporting structure 66 that supports a track system 70 utilized for movement of the machine 50. The track system 70 may include first and second track roller frame assemblies 72, which are spaced from and adjacent respective first and second sides of the undercarriage structure 64. It will be appreciated that only one of the track roller frame assemblies 72 is visible in FIG. 1.

Each of the track roller frame assemblies 72 carries an idler wheel 74, a drive sprocket wheel 76, and a plurality of track guiding rollers 78. The drive sprocket wheel 76 is powered in forward and reverse directions by the machine 50. An endless track chain assembly 80 encircles each drive sprocket wheel 76, the idler wheel 74, and the track guiding rollers 78. The track chain assembly 80 includes a plurality of inter-connected track pads 82. The track guiding rollers 78 guide the track pads 82 as the track chain assembly 80 is driven by the drive sprocket wheel 76.

Figure 2:
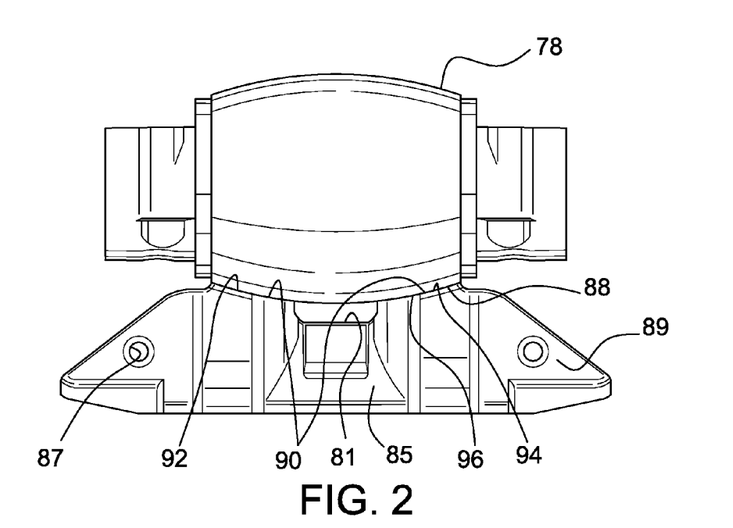
FIG. 2 is an enlarged, front elevational view of an embodiment of a roller and track pad of the track system of FIG. 1.

As shown in FIG. 2, each track pad 82 includes a pad body 85 that includes a sprocket engagement recess 81 for engagement by the drive sprocket wheel 76 flanked by a rail surface 90 for complementary positioning with the track guiding rollers 78, and at least one wear surface 84 (as seen in FIG. 1) opposite to the rail surface 90. It will be appreciated that the wear surface 84 may secured to the pad body 85 at openings 87 in flanges 89 extending along either side of the pad body 85 by any appropriate coupling arrangement, as will be understood by those of skill in the art. In alternate embodiments, the wear surface 84 may be integrally formed with the pad body 85 of the track pad 82.

Figure 3:
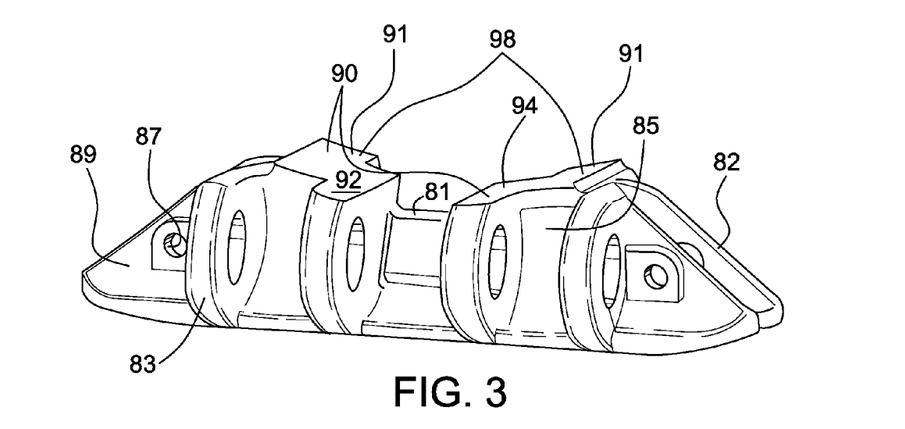
FIG. 3 is an isometric view of the track pad of FIG. 2.
Figure 4:
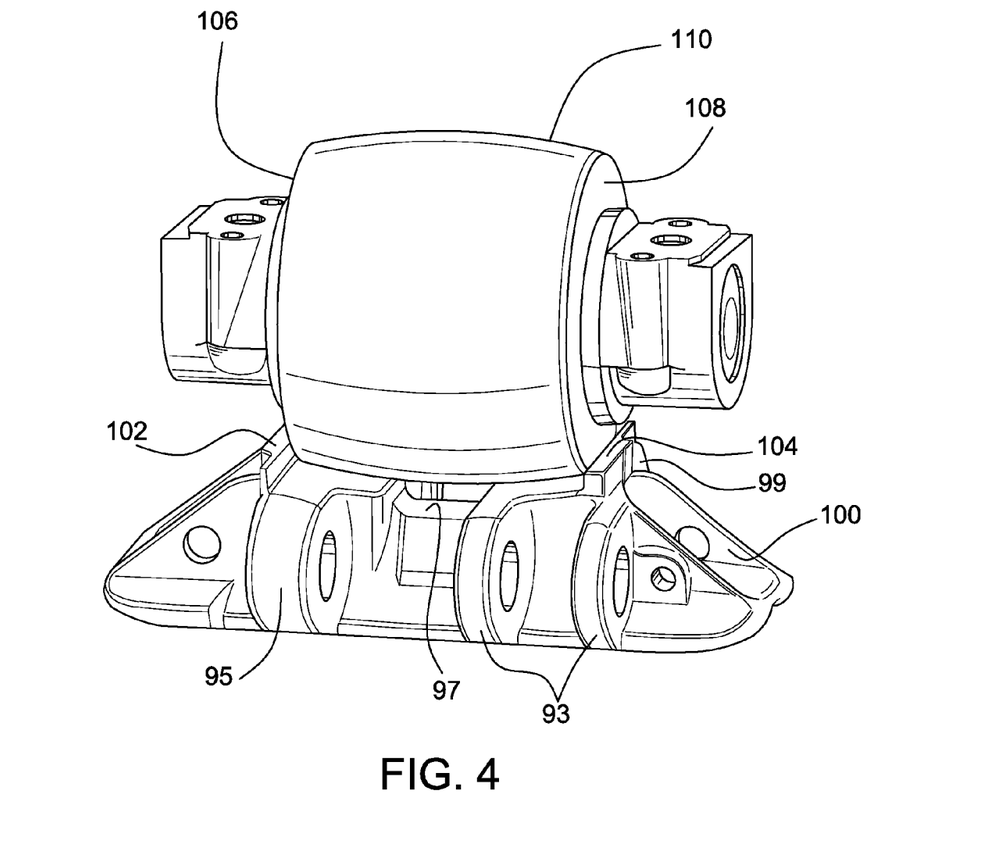
FIG. 4 is an isometric view of a second embodiment of a roller and track pad of an alternate embodiment of a track system.

As may best be seen in FIGS. 3 and 4, the track pads 82 may be coupled together at coupling junctions such as connection flanges 83 or the like extending, for example, from the pad body 85. While any appropriate number of such connection flanges 83 may be provided in any appropriate configuration, in the illustrated embodiment of FIGS. 2-3, four such connection flanges 83 are provided along one side of the track pad 82 extending in pairs along either side of the sprocket engagement recess 81. The opposite side of the track pad 82 may include, for example two such connection flanges 91 (see FIG. 3) having similar bores (not visible in FIGS. 2 and 3) adapted to be received between the pairs of connection flanges 83 of an adjacent track pad 82.

Alternate numbers of flanges and alternate arrangements of the flanges may be provided, so long as the number and size of the flanges provides adequate strength to connections between adjacent track pads 82 for use in the track chain assembly 80. In the embodiment of FIG. 4, for example, three such connection flanges 93, 95 extend from either side of the track pad 100. It will be noted that, in this embodiment, a pair of connection flanges 93 extend from one side of the track pad 100 along one side of the sprocket engagement recess 97, while a single connection flange 95 extends from the same side of the track pad 100 along the opposite side of the connection flange 95. Similarly, a single such connection flange 99 extends from the opposite side of the track pad 100 along one side of the sprocket engagement recess 97, with a pair of connection flanges (not visible in FIG. 4) extend from the opposite side of sprocket engagement recess 97. Thus, in connecting a plurality of track pads 100 such as those illustrated in FIG. 4, the single connection flange 95 from a first such track pad 100 is received in the pair of flanges from a second such track pad 100, while the single connection flange from the second such track pad is received in the pair of flanges 93 from the first such track pad 100 along the opposite side of the sprocket engagement recess 97.

Although any appropriate coupling arrangement may be utilized, in the illustrated embodiment, bores 91 extend through the connections flanges 83, 91, 93, 95, 99. A coupler, such as a pin or shaft (not illustrated), may be inserted into the bores 91 to couple pairs of track pads 82, 100 together to form the track chain assembly 80. It will be appreciated that the connection of adjacent track pads 82, 100 in this manner allows flexibility as the track chain assembly 80 moves along the idler wheel 74, drive sprocket wheel 76 and the plurality of track guiding rollers 78. Additionally, the coupler may be removed to permit removal and repair or replacement of a damaged or worn track pad 82, 100.

Turning again to FIG. 2, there is illustrated an enlarged fragmentary view of a track guiding roller 78 and a track pad 82. The track guiding roller 78 is mounted within the supporting structure 66 to rotate about an axis 86. The track guiding roller 78 further includes an annular engagement surface 88 that engages a rail surface 90 of the track pad 82. The track pad 82 includes left and right surfaces 92, 94 along either side of the sprocket engagement recess 81. The left and right surfaces 92, 94 together form the rail surface 90 supported on the track guiding roller 78. The modifiers "left" and "right" in this context are used only as conveniences in describing the illustrated structures and are not meant to be limiting.

According to an aspect of this disclosure, one of the rail surface 90 of the track pad 82 and the annular engagement surface 88 of the track guiding roller 78 presents an engaging surface 96 with a convex profile while the other presents a complementary engaging surface 98 with a concave profile. For the purposes of this disclosure, the terms "convex" and "concave" are not limited to rounded structures. Rather, the terms "convex" and "concave" are intended to include structures that present a lateral cross-section similar to the surfaces of a cross-section of bowl-like, conical, or funnel structure, i.e., the terms "convex" and "concave" but are not limited to strictly curved surfaces, as will be understood with reference to the following disclosure. In other words, taken in a transverse cross-section, the rail surface 90 of the track pad 82 is not disposed in a single plane or in linear planes parallel to the wear surface 84, or, as in the embodiment illustrated in FIG. 2, the left and right surfaces 92, 94 of the track pad 82 are not parallel to one another or disposed along a single linear plane.

With regard to the track guiding roller 78, the annular engagement surface 88 does not engage the rail surface 90 in a single plane or in parallel planes along either side of the sprocket engagement recess 81, as in prior art designs. Thus, the terms "convex" and "concave" are intended to refer to structures such as provided by a cross-section of a rounded bowl as well as a cross-section of a cone or funnel having straight, but inclined sides, or any combination thereof.

In the embodiment of FIG. 2, the track guiding roller 78 presents a convex annular engagement surface 88, while the track pad 82 presents a concave rail surface 90. That is, the left and right surfaces 92, 94 of the track pad 82 present a concave rail surface 90, as may best be seen in FIG. 3. Moreover, the convex annular engagement surface 88 and the concave rail surface 90 are arcuate, as may best be seen in FIG. 2.

Consistent with the convex/concave engagement surface structure, the track guiding roller 78 and/or the track pad 82 may have structures other than those illustrated in FIGS. 2 and 3. Turning to FIG. 4, for example, in another embodiment, the track pad 100 includes one or more guide flanges 102, 104 that may be disposed on either or both ends 106, 108 of the track guiding roller 110. It will be appreciated that the guide flanges 102, 104 may further enhance a self-guiding feature of the structures.

Figure 5:
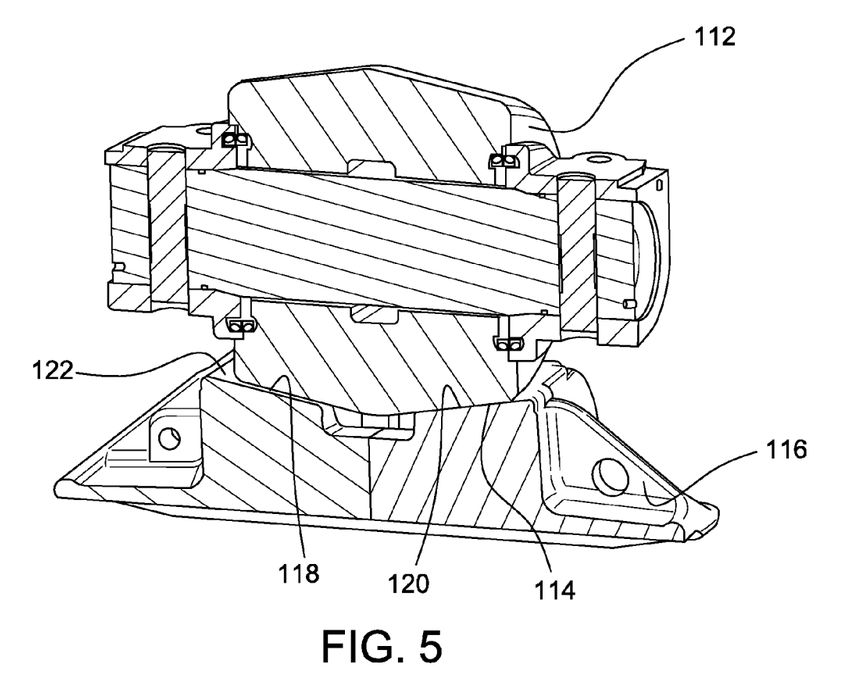
FIG. 5 is a cross-sectioned isometric view of a third embodiment of a roller and track pad of an alternate embodiment of a track system.
Figure 6:
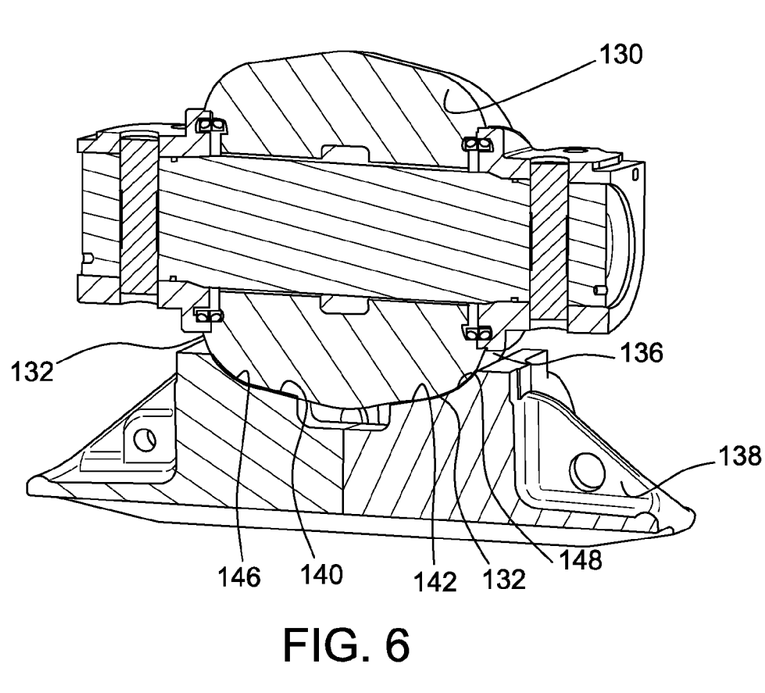
FIG. 6 is a cross-sectioned isometric view of a fourth embodiment of a roller and track pad of an alternate embodiment of a track system.

While the annular engagement surface 88 of the track guiding roller 78, 110 and the rail surface 90 of the track pad 82, 100 of FIGS. 2-4 include arcuate profiles, in the embodiment of FIG. 5, generally V-shaped profiles are provided, while in FIG. 6, a mixture of V-shaped and arcuate profiles are provided. More specifically, in FIG. 5, the track guiding roller 112 includes a convex annular engagement surface 114 that includes a substantially V-shaped profile. Likewise, the track pad 116 includes left and right surfaces 118, 120 that present a complementary, generally V-shaped concave rail surface 122. Similarly, in FIG. 6, the track guiding roller 130 includes a convex annular engagement surface 132 that includes a substantially V-shaped profile, but the edges of the convex annular engagement surface 132 are rounded near either end 134, 136 of the track guiding roller 130. Likewise, the track pad 138 includes left and right surfaces 140, 142 that present a complementary, generally V-shaped concave rail surface 144 that is rounded toward external edges 146, 148 that are disposed near the ends 134, 136 of the track guiding roller 130. It will be appreciated that any of the track pads (for example, track pads 116, 138) may include guide flanges in a manner similar to that illustrated in connection with the guide flanges 102, 104 of FIG. 4.

Figure 7:
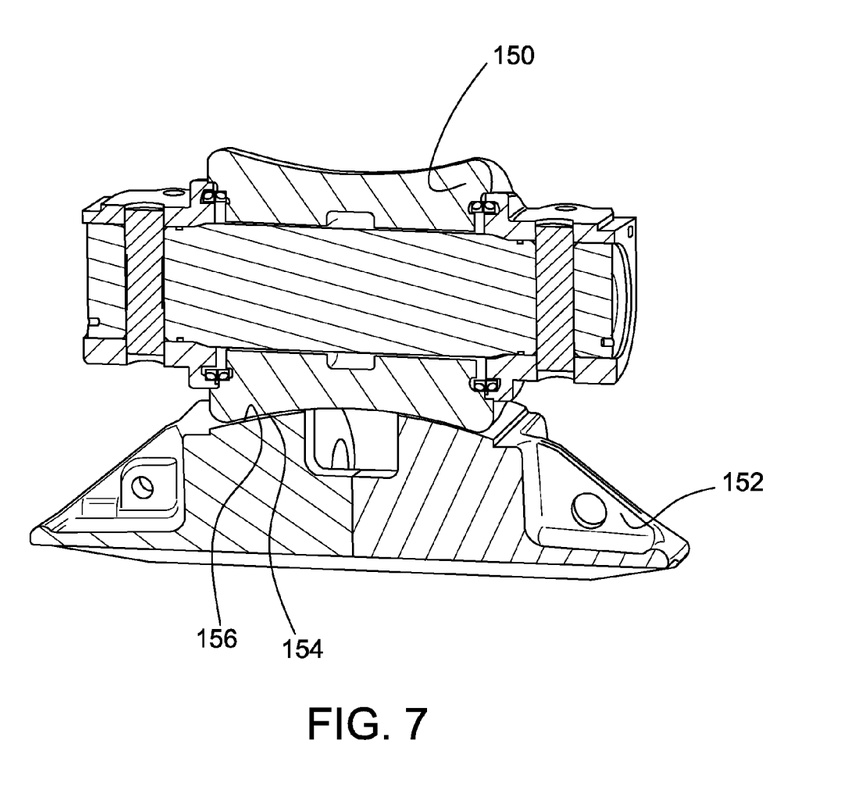
FIG. 7 is a cross-sectioned isometric view of a fifth embodiment of a roller and track pad of an alternate embodiment of a track system.

Further, while track guiding rollers 78, 110, 112, 130 of FIGS. 1-6 have been illustrated as presenting a convex profile, and the track pads 82, 116, 138 have been illustrated as presenting a concave profile, the track chain assembly 80 may include track rollers 150 that present a concave profile while the track pads 152 present a convex profile, as illustrated, for example, in FIG. 7. In this embodiment, the track roller 150 includes a concave annular engagement surface 154, and the track pad 152 presents a convex rail surface 156. While this embodiment includes arcuately shaped surfaces, the complementary profiles may have alternate convex and concave shapes, such as, for example, the V-shaped surfaces or combinations of V-shaped and arcuate surfaces. Further, as with the embodiment of FIG. 4, the track pad may include guide flanges that are disposed along either end of the track guiding roller during operation.

It will be appreciated by those of skill in the art that the complementary convex/concave nature of the annular engagement surface 88, 114, 132, 154 and the rail surface 90, 122, 144, 156 provides a greater engagement surface area than traditional arrangements of the prior art. In some embodiments according to the disclosure, for example, on the order of 25% to 50% of the lateral width of the engagement surface 88, 114, 132, 154 of the track guiding roller 78, 110, 112, 130, 150 engages the rail surface 90 of the track pad 82 as viewed in a lateral cross-section, such as, for example a lateral cross-section as viewed in FIGS. 5-7. The engagement may be considerably greater, however, for example, on the order of 50% to 70%, for example.

INDUSTRIAL APPLICABILITY

The present disclosure may be applicable to machines that commonly employ track systems, as opposed to wheels. Accordingly, the disclosure may be particularly applicable to different types of mining and construction machines, such as excavators, wheel loaders, hydraulic mining shovels, cable shovels, bucket wheels, and draglines. Some embodiments may be particularly useful in heavy-duty applications.

Some embodiments may be self-guiding. Some may eliminate the need for a center flange on the track guiding roller as a guide feature.

Some embodiments of the present disclosure may increase the contact area between engaging surfaces of the track guiding roller and the track pad. Some embodiments may result in reduced hertzian stresses in track rollers and track pads, and may reduce wear and/or spalling along the edges of rail surfaces, particularly when the machine is inclined and the track pad is angled relative to the roller.

Some embodiments may increase the useful wear life of track roller and/or track pads, and reduce failures associated with the same.

Some embodiments may reduce down time associated with repair or replacement of the links and/or rollers in the track systems, and, as a result, may reduce expenditures associated with replacement parts and labor associated with repair and replacement. Some embodiments may enhance machine efficiency, and, by extension, related operations.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A track pad for use in conjunction with a track system of a tracked machine including a plurality of track guiding rollers having annular engagement surfaces, the track pad comprising a pad body having a wear surface, and a rail surface opposite the wear surface, the rail surface being adapted for complementary positioning with at least one of the track guiding rollers in the track system, the rail surface including a profile that is convex or concave, said profile being adapted to complement the at least one track guiding roller presenting a profile that is the other of convex or concave, edges of the concave rail surface profile or a central section of the convex rail surface profile defining the highest portion of the rail surface profile.

2. The track pad of claim 1 wherein the profile of the rail surface is arcuate.

3. The track pad of claim 1 wherein the profile of the rail surface is generally V-shaped.

4. The track pad of claim 1 wherein the profile of the rail surface includes generally V-shaped central portion and rounded edges.

5. The track pad of claim 1 further including at least one guide flange extending from the pad body opposite the wear surface, and adapted to be disposed along at least one of the ends of the at least one track guiding roller.

6. The track pad of claim 5 including at least two guide flanges extending from the pad body opposite the wear surface, and adapted to be disposed along the ends of the at least one track guiding roller.

7. The track pad of claim 1 further including a sprocket engagement recess, the rail surface including left and right surfaces extending along either side of the sprocket engagement recess.

8. A track system for use in a tracked machine, the track system comprising:
a plurality of track guiding rollers, each track guiding roller having an annular engagement surface,
a track chain assembly having a plurality of track pads, at least one said track pad including a pad body having a wear surface, and a rail surface opposite the wear surface, the rail surface being adapted for complementary positioning with at least one track guiding roller in the track system, and
at least one of the rail surface of the track pad and the annular engagement surface of the track guiding roller presenting an engaging surface with a convex profile while the other of the rail surface of the track pad and the annular engagement surface of the track guiding roller presents a complementary engaging surface with a concave profile, edges of the concave rail surface profile or a central section of the convex rail surface profile defining the highest portion of the rail surface profile.

9. The track system of claim 8 wherein the annular engagement surface of the track guiding roller presents the engaging surface with the convex profile, and the rail surface of the track pad presents the complementary engaging surface with the concave profile.

10. The track system of claim 8 wherein the annular engagement surface of the track guiding roller presents the engaging surface with the concave profile, and the rail surface of the track pad presents the complementary engaging surface with the convex profile.

11. The track system of claim 8 wherein the engaging surfaces are arcuate.

12. The track system of claim 8 wherein the engaging surfaces are generally V-shaped.

13. The track system of claim 8 wherein at least one of the engaging surfaces includes a generally V-shaped central portion and rounded edges.

14. The track system of claim 8 wherein the track pad further includes at least one guide flange extending from the pad body opposite the wear surface, and adapted to be disposed along at least one of the ends of the at least one track guiding roller.

15. The track system of claim 8 wherein the track pad comprises at least two guide flanges extending from the pad body opposite the wear surface, and adapted to be disposed along the ends of the at least one track guiding roller.

16. The track system of claim 8 wherein the track pad further includes a sprocket engagement recess, the rail surface including left and right surfaces extending along either side of the sprocket engagement recess.

17. A track system for use in a tracked machine, the track system comprising:
a plurality of track guiding rollers, each track guiding roller having an annular engagement surface,
a track chain assembly having a plurality of track pads, at least one said track pad including a pad body having a wear surface, and a rail surface opposite the wear surface, the rail surface being adapted for complementary positioning with at least one track guiding roller in the track system, and
at least one of the rail surface of the track pad and the annular engagement surface of the track guiding roller presenting an engaging surface with a convex profile while the other of the rail surface of the track pad and the annular engagement surface of the track guiding roller presents a complementary engaging surface with a concave profile, the rail surface of the track pad engaging at least 25% of the width of the engagement surface of the track guiding roller, edges of the concave rail surface profile or a central section of the convex rail surface profile defining the highest portion of the rail surface profile.

18. The track system of claim 17 wherein the track pads each include a sprocket engagement recess, and the rail surface includes left and right surfaces separated by the sprocket engagement recess.

19. The track system of claim 17 wherein the rail surface of the track pad engages at least 25% and as much as 50% of the width of the engagement surface of the track guiding roller.

20. The track system of claim 17 wherein the rail surface of the track pad engages at least 50% and as much as 75% of the width of the engagement surface of the track guiding roller.

* * * * *